United States Patent [19]

Hegedus et al.

[11] Patent Number: 4,975,256

[45] Date of Patent: Dec. 4, 1990

[54] PROCESS USING CATALYSTS FOR SELECTIVE CATALYTIC REDUCTION DENOX TECHNOLOGY

[75] Inventors: Louis Hegedus, Rockville; Jean W. Beeckman; Wie-Hin Pan, both of Columbia; Jeffrey P. Solar, Silver Spring, all of Md.

[73] Assignee: W. R. Grace & Co.-Conn., New York, N.Y.

[21] Appl. No.: 417,141

[22] Filed: Oct. 4, 1989

Related U.S. Application Data

[62] Division of Ser. No. 204,641, Jun. 9, 1988, Pat. No. 4,929,586.

[51] Int. Cl.$^5$ ............................ B01J 8/00; C01B 21/00
[52] U.S. Cl. ..................................................... 423/239
[58] Field of Search .................. 423/235, 235 D, 239, 423/239 A

[56] References Cited

U.S. PATENT DOCUMENTS

| | | | |
|---|---|---|---|
| 4,010,238 | 3/1977 | Shiraishi et al. | 423/239 |
| 4,048,112 | 9/1977 | Matsushita et al. | 252/461 |
| 4,085,193 | 4/1978 | Nakajima et al. | 423/239 |
| 4,113,660 | 9/1978 | Abe et al. | 252/455 R |
| 4,176,089 | 11/1979 | Cull | 252/452 |
| 4,188,365 | 2/1980 | Yoshioka et al. | 423/239 |
| 4,221,768 | 9/1980 | Inoue et al. | 423/239 |
| 4,225,462 | 9/1980 | Umemura et al. | 252/440 |
| 4,280,926 | 7/1981 | Abe et al. | 252/430 |
| 4,466,947 | 8/1984 | Imanari et al. | 423/239 |
| 4,520,124 | 5/1985 | Abe et al. | 502/159 |
| 4,705,770 | 11/1987 | Cullo et al. | 502/242 |
| 4,725,572 | 2/1988 | Sera et al. | 502/236 |
| 4,774,219 | 9/1988 | Boxhoorn et al. | 502/227 |
| 4,833,113 | 5/1989 | Imanari et al. | 423/239 |
| 4,855,115 | 8/1989 | Imanari et al. | 423/239 |
| 4,859,439 | 8/1989 | Rikimaru et al. | 423/239 |

FOREIGN PATENT DOCUMENTS

| | | | |
|---|---|---|---|
| 256359 | 2/1988 | European Pat. Off. | |
| 256590 | 2/1988 | European Pat. Off. | |
| 260614 | 3/1988 | European Pat. Off. | |
| 268265 | 5/1988 | European Pat. Off. | |
| 56-108517 | 8/1981 | Japan | 423/239 |
| 2149680 | 10/1983 | United Kingdom | |

*Primary Examiner*—Gregory A. Heller
*Attorney, Agent, or Firm*—Edward J. Cabic

[57] ABSTRACT

Catalysts for the selective catalytic reduction of NOx by ammonia are made from porous formed supports having a certain fraction of the pores with pore diameters larger than 600 Angstrom units. Thus macropores can be introduced in a formed $TiO_2$ support by adding burnout materials or some inorganic oxide prior to forming the titania into the formed support. Alternatively, titania is precipitated onto a porous inorganic oxide such as $SiO_2$, $Al_2O_3$, $ZrO_2$, $AlPO_4$, $Fe_2O_3$ and $B_2O_3$ to form the support. Then conventional DeNOx catalytic metals are added. The support can be made by first impregnating the inorganic oxide particles with titania via a soluble precursor, forming titania and then shaping the coated particles into the desired shape such as a monolith. In a second embodiment, the inorganic oxide particles are first formed into the desired shape and then impregnated with the titania forming material. Barium sulfate can be added to the surface of the porous inorganic oxide to make an improved support.

14 Claims, 1 Drawing Sheet

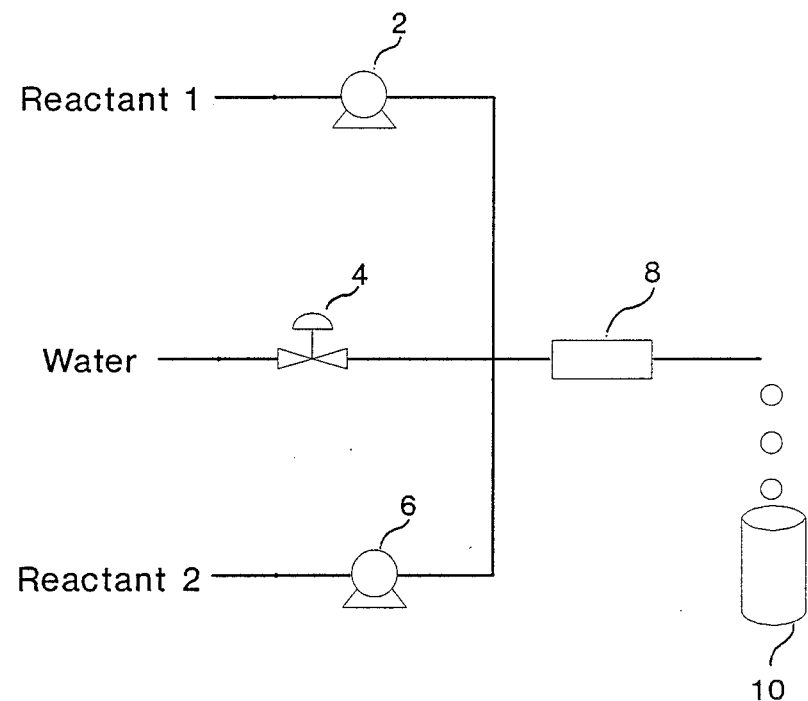

PROCESS USING CATALYSTS FOR SELECTIVE CATALYTIC REDUCTION DENOX TECHNOLOGY

This is a division, of application Ser. No. 204,641, filed June 9, 1988, now U.S. Pat. No. 4,929,586.

BACKGROUND OF THE INVENTION

1. Field of the Invention

This invention relates to catalysts made of porous titania which can be deposited on an inorganic support, and which may or may not contain additional ingredients such as oxides of vanadium and tungsten for the reduction of nitrogen oxides by ammonia.

2. Description of the Previously Published Art

Nitrogen oxides have been selectively reduced in the presence of ammonia and various types of catalysts.

U.S. Pat. No. 4,048,112 discloses a catalyst for the selective reduction of nitrogen oxides in exhaust gases in the presence of ammonia. The catalyst is made of vanadium oxide supported on a carrier of titanium oxide in the anatase form.

U.S. Pat. No. 4,085,193 discloses catalysts for removing $NO_x$. Among the materials disclosed is titania and at least an oxide of molybdenum, tungsten, iron, vanadium, nickel, cobalt, copper, chromium or uranium.

U.S. Pat. No. 4,010,238 discloses a process to remove $NO_x$ in the presence of ammonia and a vanadium oxide catalyst of the formula $V_xA_yO_z$ where V is vanadium, A is Cu, Zn, Sn, Pb, Ti, P, Cr, Fe Co and Ni, x and y are each a numeral of 0.5 to 12 and z is a numeral of 1 to 60.

U.S. Pat. No. 4,225,462 discloses using barium sulfate and vanadium (IV) oxide sulfate to make a water resistant catalyst for reducing nitrogen oxide with ammonia.

U.S. Pat. No. 4,176,089 discloses making high surface area, low bulk density mixed silica-titania materials useful for catalysts for the selective reduction of nitrogen oxides with ammonia. The catalysts are made by premixing the alkoxides of titanium and silicon and adding the premixed alkoxides to a hydrolysis medium so as to form a silica-titania precipitate.

U.S. Pat. No. 4,188,365 discloses a catalyst for the vapor phase reduction of nitrogen oxides with ammonia. The catalyst has a catalytic metal compound on a shaped carrier of $TiO_2$ and a clay mineral having an average particle size of 0.1 to 100 microns. The shaped carrier can also contain inorganic fibrous material and small particles of silica hydrogel and silica sol.

U.S. Pat. No. 4,221,768 discloses a process to remove nitrogen oxides with ammonia by using a catalyst made of an intimately mixed binary ($TiO_2$—$SiO_2$) or ternary ($TiO_2$—$ZrO_2$—$SiO_2$) oxide with no cladding and with no co-precipitation. These binary and ternary oxides are not mere mixtures of the individual oxides.

Great Britain Pat. No. 2,149,680 discloses a catalyst for the removal of nitrogen oxides made of (A) 80 to 95% by weight of an oxide obtained by thermal treatment of either binary hydrous oxide of titanium and silicon, a binary hydrous oxide of titanium and zirconium or a ternary hydrous oxide of titanium, zirconium and silicon in the presence of sulfuric acid or ammonium sulfate, (B) from 0 to 5% by weight of vanadium oxide, and (C) from 1 to 15% by weight of an oxide of tungsten, molybdenum, tin or cerium.

U.S. Pat. No. 4,280,926 (and its divisional 4,520,124) form a slurry of 1-20 mm long fibers which can be a silica fiber with diameter of 0.1-30 microns. Then either $TiO_2$ or $Al_2O_3$ forming materials are added and a sheet is made by papermaking means. These sheets can be formed into a honeycomb structure. The sheets are then impregnated with catalytically active agents.

U.S. Pat. No. 4,113,660 discloses making a titania catalyst using a metatitanic acid sol or gel.

T. Shikada et al. in "Reduction of Nitric Oxide by Ammonia over Silica Supported Vanadium Oxide Catalysts (III). Effects of Additives" in Nenryo Hyokai Shi, vol. 58 page 1055 (1979) disclose treating silica gel with titanic sulfate solution, neutralizing with ammonia water, drying, adding vanadyl oxalate solution, drying and finally calcining in air at 350° C. for 3 hours to produce a catalyst for the reduction of nitric oxides by ammonia. They found that the amount of $TiO_2$ required for modifying the surface of the silica is not high. A 3% level was sufficient and that as the $TiO_2$ content increased beyond this point the activity declined.

U.S. Pat. No. 4,705,770 discloses making an attrition resistant catalyst from titanyl sulfate which can be used in a fluidized bed. Small particles are made for fluidization. There appears to be no discussion of macroporosity; all the mean pore diameters are 232 Angstrom units or less. Furthermore, they do not intend to form a shaped support which has macroporosity.

OBJECTS OF THE INVENTION

It is an object of this invention to enhance the catalyst $NO_x$ removal performance and reduce the manufacturing cost of an SCR catalyst.

It is a further object of this invention to extend the catalyst life by improving the poison resistance.

It is a further object of this invention to reduce the manufacturing cost by reducing the amount of titania employed in the monolith structure of an SCR catalyst.

It is a further object of this invention to reduce or limit the $SO_2$ oxidation activity while at the same g $NO_x$ removal activity.

It is a further object of this invention to reduce the operating temperatures for given $NO_x$ removal requirements.

It is a further object of this invention to reduce the required reactor volume for a given $NO_x$ conversion and hence simultaneously reduce the reactor pressure drop.

It is a further object of this invention to reduce the unreacted ammonia at the exit of the SCR reactor.

These and further objects will become apparent as the description of the invention proceeds.

SUMMARY OF THE INVENTION

The feasibility of NOx removal through selective catalytic reduction with $NH_3$ in the presence of $O_2$ has been known for sometime and proceeds as follows:

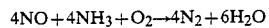

$4NO + 4NH_3 + O_2 \rightarrow 4N_2 + 6H_2O$

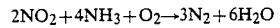

$2NO_2 + 4NH_3 + O_2 \rightarrow 3N_2 + 6H_2O$

In contrast to previous $NO_x$ removal (DeNOx) catalysts which utilize a bulk titania support, we have obtained a superior catalyst consisting of titania with the appropriate catalytic metal oxide function either alone with the proper porosity or supported on a porous inorganic oxide. Based on reaction engineering principles, we have successfully mathematically modeled the overall catalytic DeNOX reaction under various conditions. Further mathematical catalyst optimization studies have led us to uncover a route to improved DeNOX catalysts. Our model predicts that catalysts having a fraction of pores larger than 600 Angstrom units will have better activities than those without these large pores. As will be described below, we have successfully obtained catalysts incorporating this porosity and, as predicted by our mathematical modeling, the DeNOX activity is superior to that of commercially available catalysts which contain very few or no pores larger than 600 Angstrom units. Furthermore, by partially replacing the expensive bulk titania by a low-cost porous metal oxide, the cost of preparing the catalyst is substantially reduced while the strength of the catalyst is increased.

In one embodiment the catalyst is made of titania particles alone where the formed catalyst has the proper porosity in pores larger than 600 Angstrom units. An optional feature of this embodiment is that porous inorganic oxide particles can be mixed in an amount up to 40% by weight to produce a formed support which has a total porosity of up to 0.80 cc/cc of the formed catalyst which is made up of a micropore porosity (comprising pores having a pore diameter 600 Angstrom units or less) of 0.05 to 0.5 cc/cc and a macroporosity (comprising pores having diameters greater than 600 Angstrom units) of 0.05 to 0.5 cc/cc. The titania is present substantially in the anatase phase. The catalyst is made by depositing on the support a metal oxide catalytic component such as $V_2O_5$, $MoO_3$, $WO_3$, $Fe_2O_3$, $CuSO_4$, $VOSO_4$, $SnO_2$, $Mn_2O_3$, $Mn_3O_4$, or mixtures thereof. Preferably the metal oxide is present in an amount from a catalytically effective amount to 25% by weight of the entire catalyst.

In another embodiment, the titania can be precipitated onto a porous inorganic oxide such as $SiO_2$, $Al_2O_3$, $ZrO_2$, $AlPO_4$, $Fe_2O_3$ and $B_2O_3$, for example, by two procedures. In the preferred first procedure, the inorganic oxide particles are first impregnated with titania via a soluble precursor so that the internal and external surface of the particles becomes coated with titania. These coated particles, after calcining at about 500° C., are referred to as precursor powder. They may be formed, for example by extrusion, into a useful catalyst support shape such as a monolith, extrudate, bead or plate.

In the second titania adding procedure, the inorganic support is extruded into the final form and then impregnated with titania forming a titania coating on the surface area of the inorganic support particles throughout the formed body.

In another embodiment of the invention, barium sulfate is added to the surface of the inorganic oxide such as $SiO_2$ to make an improved support. This can either be done by the direct addition of barium sulfate or by adding a barium compound which will form barium sulfate in situ. The $TiO_2$ can be added either concurrently with or following the addition of the barium sulfate. When a catalytic metal oxide such as $V_2O_5$ is added to make a catalyst, the DeNOX activity is greater than a similar catalyst made without the barium sulfate addition. The preferred amount of barium sulfate to be added is from 1 to 15 wt% of the formed metal oxide support.

A preferable inexpensive inorganic oxide support is silica (either gel or precipitated) such as Syloid 74 (W. R. Grace & Co.) or Zeofinn XP-113 (Zeofinn Oy, Finland). Preferably, the surface area of the support with the titania and catalyst is from a catalytically effective amount up to 350 $m^2$/cc, or, more preferably, one that is between 25 $m^2$/cc and 200 $m^2$/cc. Preferably the pore diameter distribution of the formed body should cover the range from 0 to 100,000 Angstrom units. Preferably lthe support should have a micropore diameter distribution between 0 and 600 Angstrom units, more preferably between 50 and 150 Angstrom units, and a macropore diameter distribution between 600 and 100,000 Angstrom units, more preferably between 1,000 and 20,000 Angstrom units. Although the mathematical model tends to maximize the porosity, we prefer, due to the limitation of strength, a maximum total porosity of 0.80 cc/cc, or more preferably, between 0.5 and 0.75 cc/cc. The microporosity is preferably between 0.05 and 0.50 cc/cc and macroporosity preferably between 0.05 and 0.50 cc/cc.

BRIEF DESCRIPTION OF THE FIGURE

The FIGURE is a schematic diagram of a tubular reactor set-up used to make the support of this invention.

DESCRIPTION OF THE PREFERRED EMBODIMENTS

When making the catalyst support with titania particles alone, it is preferable to mix burnout materials with the titania particles and to then form the mixture into the desired shape such as a monolith. Examples of burnout materials are polyethylene oxide, methylcellulose, starch or flour, polyethylene or any of the polymeric microspheres or microwaxes. To aid in extrusion conventional binders and extrusion aids can be added such as clay, glass fibers, and polyethylene oxide. Optionally porous inorganic oxide particles can be added in an amount up to 40% by weight to the titania particles to give the resultant mixture the desired macroporosity. Again, burnout materials can also be added to provide additional macroporosity and extrusion aids can also be added. The formed catalyst support has a total porosity of up to 0.80 cc/cc of the formed catalyst which is made up of a micropore porosity (comprising pores having a pore diameter 600 Angstrom units or less) of 0.05 to 0.5 cc/cc and a macroporosity (comprising pores having diameters greater than 600 Angstrom units) of 0.05 to 0.5 cc/cc. The titania is present substantially in the anatase phase. The catalyst is made by depositing on the support a metal oxide catalytic component such as $V_2O_5$, $MoO_3$, $WO_3$, $Fe_2O_3$, $CuSO_4$, $VOSO_4$, $Mn_2O_3$, $Mn_3O_4$, or mixtures thereof. Preferably the metal oxide is present in an amount from a catalytically effective amount to 25% by weight of the entire catalyst.

Another embodiment involves producing the macroporous titania support by depositing the titania on a porous inorganic oxide support. One procedure to do this is to apply the titania to particles of the porous inorganic oxide. These titania containing inorganic oxide particles are referred to as precursor powder since they will be used to form the formed porous support on which the catalyst particles will be deposited. To apply the titania onto the appropriate inorganic oxide support, a soluble titania precursor is used. The soluble titania precursor can be one of, but not limited to: titanyl sulfate (e.g., UNITI 992, Kemira), titanyl chloride (e.g., UNITI 102, Kemira), titanium tetraalkoxide, and titania sol (Nalco). The soluble precursor can be hydrolyzed by the addition of base in the presence of the supporting metal oxide. The base may be any of, but not limited to, alkali metal hydroxides or carbonates, ammonium hydroxide or carbonate, any of the alkyl amines, urea, or hexamethylenetetraamine.

When titanium tetra-alkoxide is used, it can be impregnated as an alcohol solution onto the metal oxide support or it can first be dissolved in acidic solution (preferably hydrochloric acid) and then hydrolyzed in the presence of the metal oxide support.

The hydrolysis may be carried out in a reaction pot wherein the base solution is added to a mixture of the titania precursor and the inorganic oxide support. Alternatively, the components may be added simultaneously to a reaction pot so as to cause precipitation of the titania precursor in the presence of the inorganic oxide support.

Another alternative is to carry out the hydrolysis in a tubular reactor. Such a tubular reactor process is schematically described in the FIGURE. A slurry of a $TiO_2$ precursor and an inorganic oxide support, denoted Reactant 1, are fed through pump 2 to the stationary mixer 8. Water is supplied through valve 4 and Reactant 2, a base, is also supplied by pump 6 to the stationary mixer. The flows of the reactants are adjusted such that the pH of the suspension exiting from the tube is sufficient to cause precipitation of the titania precursor. The product is collected in container 10. A pH range between 5-12 can be used although a pH of 7 is preferable.

In the second titania coating procedure, the inorganic support is extruded into the desired form such as a monolith and then it is impregnated with titania forming a titania coating on the surface area of the formed inorganic support. In this case, the $TiO_2$ may be impregnated by dipping the extruded body in $TiO_2$ sol.

Following deposition of the $TiO_2$ on the inorganic oxide support, the support is calcined for about 2 hours preferably between 300°-900° C. more preferably 400°-650° C. The final fraction of titania on the total support is between 5 and 80 wt%, preferably between 15 and 50 wt%. Below 5 wt% the catalyst has a low activity and above about 80 wt% the catalyst becomes economically unattractive to manufacture.

The formed support is characterized by porosity which is measured in units of cc/cc. The porosity is obtained from the pore volume of the support and the bulk density. For example, for a support having a pore volume of 0.96 cc/g and a bulk density of 0.75 g/cc, the porosity would be the product of these two values which is 0.72 cc/cc.

The catalyst is made by adding to the calcined support metal oxides such as $V_2O_5$, $MoO_3$, $WO_3$, $Fe_2O_3$, $CuSO_4$, $VOSO_4$, $SnO_2$, $Mn_2O_3$, $Mn_3O_4$ or a combination thereof. The catalyst component or components are added to the support after the titania has been precipitated on the inorganic oxide either before or after the support shape is formed. The amount of the catalyst component is from a catalytically effective amount up to 25% by weight of the entire catalyst.

The catalyst may be prepared by one of several means. Thus, for example, the $TiO_2$-inorganic oxide support can first be impregnated with $WO_3$ before or after extrusion. For this purpose, an aqueous solution of ammonium metatungstate may be used to impregnate the support to incipient wetness. The amount of ammonium metatungstate to be used depends on the desired final percentage of $WO_3$ (which may preferably range from 1 to 20 wt%). The impregnated support may then be dried and calcined for example at 500°-550° C. for 2 hours.

The support, with or without $WO_3$, can then be impregnated with $V_2O_5$ before or after the extruded body is formed. The $V_2O_5$ precursor used can be an aqueous solution of vanadyl oxalate at a concentration which is appropriate to give the final desired $V_2O_5$ content (typically 0.5-20 wt%) in the catalyst. If the impregnation is to be carried out before the extrusion, then the support powder may be impregnated to incipient wetness with the $V_2O_5$ precursor solution followed by drying (100°-150° C. for about 12 hours). The dried powder can then be used for extrusion. Alternatively, if the $V_2O_5$ is to be impregnated after the extrusion, the extruded body is first dried and calcined (for example, at 500°-550° C. for 2 hours) and then dipped in the appropriate $V_2O_5$ precursor solution. The extrusion can be carried out in a number of ways familiar to those skillful in the art.

The present catalyst is characterized by the presence of titania in the anatase phase. When silica is used as the metal oxide, the titania/silica product is not a chemical composite on the atomic scale. Instead, it is a physical mixture with anatase titania finely dispersed on bulk silica. The anatase titania particle size, as measured by the X-ray line broadening method (H. P. Klug and L. E. Alexander, "X-ray Diffraction Procedures for Polycrystalline and Amorphous Materials") typically averages about 50 Angstrom units. It can also be measured by EXAFS (extended X-ray absorption fine structure).

It is important to point out here that for the purpose of this invention, it is undesirable, indeed disadvantageous, to have a silica-titania chemical composite such as described in U.S. Pat. 4,221,768 and GB 2,149,680. The latter patents teach the preparation of a Ti-Si composite oxide wherein the final product does not contain a distinct anatase titania phase. Similarly U.S. Pat. No. 4,176,089 also has a co-precipitation which results in an undesirable catalyst because the anatase phase would not be present. In the present case, our final titania/silica product shows the presence of titania anatase phase and it is not a chemical composite on the atomic scale. It is finely dispersed anatase titania on bulk silica.

The inorganic oxide support chosen should largely determine the desired pore structure in the formed catalyst. The desired pore structure should have an average micropore diameter of less than 600 Angstrom units, more preferably between 50 and 150 Angstrom units and a macropore diameter distribution between 600 and 100,000 Angstrom units, more preferably between 1000 and 20,000 Angstrom units. If the inorganic oxide support does not give the desired pore structure, burn-out material may be added to give the right amount of macroporosity. In the latter case, one of several burn-out materials may be used including, but not limited to, polyethylene oxide, methylcellulose, starch or flour, polyethylene or any of the polymeric microspheres or microwaxes.

In another preferred embodiment, $BaSO_4$ is added during precipitation of the $TiO_2$. This appears to add sulfate in the support which is advantageous for higher activity. The barium sulfate can be added as barium sulfate or as a soluble barium salt precursor such as barium chloride, barium nitrate, barium acetate, barium hydroxide or mixtures of these salts. Conversion to barium sulfate is achieved by adding sulfuric acid.

Having described the basic aspects of our invention, the following examples are given to illustrate specific embodiments thereof.

EXAMPLE 1

This example illustrates the synthesis of 40% $TiO_2$ on precipitated silica.

3.1 kg of Zeofinn Oy Grade XP113 $SiO_2$ were mixed with 16.26 liters of Kemira UNITI 992 titanyl sulfate (9.3% $TiO_2$, 1.32 g/cc). The resultant slurry was dripped at a rate of 6 liters per hour into 13 liters of heel water. The heel was stirred and maintained at a pH of between 2.5 and 3.0 by the addition of concentrated aqueous ammonia.

After the addition of the titanyl sulfate-silica slurry was complete, the ammonia addition was continued until the pH was raised to 7.0. The mixture was stirred for an additional 30 minutes before the product was collected by filtration. After washing with distilled water, the support was dried and calcined to 550° C. A sample, formed into a round disc (1" diameter, 1 cm thick, pressed at 10,000 lbs), was analyzed by mercury intrusion porosimetry and found to have a total porosity of 0.61 cc/cc with 0.29 cc/cc of porosity in pores greater than 600 Angstrom units in diameter. The surface area, measured by the BET method, was found to be 131 $m^2/cc$ and X-ray diffraction analysis demonstrated that the product contained anatase $TiO_2$.

A solution of vanadyl oxalate was prepared by dissolving 0.56 g of $V_2O_5$ and 1.453 g of oxalic acid in 9 ml of hot water. The solution was used to impregnate 15.0 g of the $TiO_2/SiO_2$ powder from the above preparation, using the method of incipient wetness. The resulting dried powder was calcined at 520° C. for 3 hours.

EXAMPLE 2

This example illustrates the synthesis of 40% $TiO_2$ on silica gel.

The procedure described in Example 1 was followed using Syloid 74 (W. R. Grace & Co.) $SiO_2$ which is a silica gel. A sample of the calcined product, formed into a round disc (1" diameter, 1 cm thick, pressed at 10,000 lbs), was analyzed by mercury intrusion porosimetry and found to have a total porosity of 0.72 cc/cc with 0.20 cc/cc of porosity in pores greater than 600 Angstrom units in diameter. The surface area, measured by the BET method, was found to be 162 $m^2/cc$ and X-ray diffraction analysis demonstrated that the product contained anatase $TiO_2$.

A solution of vanadyl oxalate was prepared by dissolving 61.2 g of $V_2O_5$ and 157.5 g of oxalic acid in 1.80 l of hot water. The solution was used to impregnate 1.64 kg of the $TiO_2/SiO_2$ powder from the above preparation, using the method of incipient wetness. The resulting dried powder was calcined at 520° C. for 3 hours.

EXAMPLE 3

This example prepares a catalyst according to the present invention where barium sulfate is also added.

A solution of 2.50 g. of $BaCl_2$ in 50 ml of $H_2O$ was impregnated into 25 g of $SiO_2$ (Syloid X6000 sold by W. R. Grace & Co.). The solids were dried and slurried with 150 ml of 6M $H_2SO_4$. After the solids were collected by filtration and washed with water, the white powder was dried and calcined at 300° C. for 2 hours.

The product was combined with 185.8 g of $TiOSO_4$ solution (KEMIRA UNITI 992, 120 g $TiO_2/l$) and 400 ml of $H_2O$. $NH_4OH$ was added to neutralize the mixture which was then filtered. The solids were washed with water, dried, and calcined at 500° C. for 6 hours.

A solution of vanadyl oxalate was prepared by dissolving 1.887 g of $V_2O_5$ and 4.855 g of oxalic acid in 50 ml of hot water. The solution was used to impregnate the product using the method of incipient wetness. The resulting dried powder was calcined at 520° C. for 3 hours.

EXAMPLE 4

A comparison catalyst was prepared from anatase $TiO_2$.

A solution of vanadyl oxalate was prepared by dissolving 0.097 g of $NH_4VO_3$ and 0.194 g of oxalic acid into 10 ml of hot water. The solution was used to impregnate 15.0 g of $TiO_2$ powder having a surface area of 100 $m^2/g$ using the method of incipient wetness. The resulting dried powder was calcined at 520° C. for 3 hours.

EXAMPLE 5

This comparison example prepares a catalyst from a physical mixture of anatase $TiO_2$ and silica.

A solution of vanadyl oxalate was prepared by dissolving 0.097 g of $NH_4VO_3$ and 0.194 g of oxalic acid in 28 ml of hot water. The solution was used to impregnate a mixture of 6 g of $TiO_2$ powder (Sakai Chemical) and 9 g of $SiO_2$ powder (Davison 952 W. R. Grace & Co.) using the method of incipient wetness. The powder was calcined at 520° C. for 3 hours.

EXAMPLE 6

This comparison example prepares a catalyst where the silica and titania form a binary oxide as described in U.S. Pat. No. 4,221,768.

A support was prepared following the procedure of Example 1 of U.S. Pat. No. 4,221,768 as follows. 50 ml of titanyl chloride solution (Kemira Uniti 102, containing 342 g $TiO_2$ per liter) was diluted to 200 ml with ice cold water. Then, 76.5 g of Nalco 1034A colloidal silica (34% $SiO_2$) was added. While the mixture was stirred at about 25° C., aqueous ammonia was slowly added until the pH reached 9.7. The mixture was aged by allowing it to stand for 2 hours. The resulting $TiO_2$—$SiO_2$ gel was isolated by filtration, washed with water, and dried at 150° C. for 10 hours. The solid was ground and calcined at 500° C. for 3 hours. The resulting powder was found by BET analysis to have a surface area of 253 $m^2/cc$ Analysis by X-ray diffraction demonstrated that the product was amorphous. A solution of vanadyl oxalate was prepared by dissolving 0.56 g of $V_2O_5$ and 1.44 g of oxalic acid in 15 ml of hot $H_2O$. The solution was used to impregnate 15.0 g of the above $TiO_2$—$SiO_2$ powder using the method of incipient wetness. The powder was calcined at 520° C. for 3 hours.

EXAMPLE 7

The activities of the catalyst powders of Examples 1-6 were determined as follows. In a fixed bed reactor, 0.58 $cm^3$ of powder were charged and the fixed bed reactor was heated in a sand bath to the temperatures set forth in Table 1. A gas containing 900 ppm NO, 1000 ppm $NH_3$, and 4% $O_2$ in $N_2$ was passed through the catalyst bed at a rate of 200 l/hr. and the amount of NO removed measured. The results are presented in Table 1.

TABLE 1

| | Activity of Catalyst Powders | | |
| --- | --- | --- | --- |
| | % Conversion | | |
| Example | 250° C. | 300° C. | 350° C. |
| 1 | 47.4 | 86.5 | 98.8 |
| 2 | 18.5 | 48.1 | 89.1 |
| 3 | 23.6 | 60.1 | 90.0 |

TABLE 1-continued

| | Activity of Catalyst Powders | | |
| | % Conversion | | |
| Example | 250° C. | 300° C. | 350° C. |
| --- | --- | --- | --- |
| 4 | 10.5 | 33.8 | 74.3 |
| 5 | 7.4 | 22.2 | 42.7 |
| 6 | 16.7 | 33.8 | 57.2 |

The results presented in Table 1 demonstrate the superior performance of the catalysts of Example 1-3 of this invention. The catalyst of Example 4, prepared from anatase $TiO_2$, is representative of the composition of current commercial SCR catalyst and is shown to have poorer performance than the catalysts of this invention. Physical mixture of silica with such an anatase $TiO_2$ support leads to a lowered NOx conversion as shown by the catalyst of Example 5. An atomically mixed support, demonstrated by Example 6, also is shown to have poorer performance.

EXAMPLE 8

This example compares a catalyst according to the present invention with a commercial catalyst.

500 g of the $TiO_2/SiO_2$ support prepared in Example 1 was impregnated to incipient wetness with a vanadyl oxalate solution (prepared from $V_2O_5$ and oxalic acid solution) to give a final V content of 1.5 wt%. This material was then extruded into a 3 cell × 3 cell monolith piece. The cell pitch is 7.4 mm where pitch is defined as the sum of the width of the cell opening plus the wall thickness. The monolith was air-dried and then calcined at 500° C. for 2 hours.

The activity of this monolithic catalyst piece was obtained in a side by side comparison with a similarly shaped commercial catalyst which was based on $TiO_2$ with near zero macroporosity. Reactor conditions used were: 6% $O_2$, 10% $H_2O$, 350° C.; 400 ppm NO; 3000 ppm $SO_2$; 400 ppm $NH_3$; SV 7500 $h^{-1}$ (STP).

The Table 2 below compares the porosity and NOx removal activity ratio of the catalyst of the present invention and the commercial catalyst. The $SO_2$ oxidation conversion of the new catalyst was found to be 0.2% which is comparable to that of the commercial catalyst. Table 2 shows that with the higher porosity and inclusion of macroporosity, the performance of the new catalyst is significantly improved (by some 60%) over that of the less porous commercial catalyst.

TABLE 2

| | Porosity (cc/cc) | | |
| Catalyst | Microporosity Less than 600 AU | Macroporosity greater than 600 AU | Activity Ratio (1) |
| --- | --- | --- | --- |
| New Catalyst | 0.32 | 0.28 | 1.6 |
| Commercial catalyst | 0.49 | 0.03 | 1.0 |

Where AU is Angstrom units
(1) Data obtained after 9 days continuous running. The activity ratio is that of reaction rate constants with that of the commercial catalyst set at 1.0.

EXAMPLE 9

In this example, the inorganic oxide support, silica (Syloid), is first extruded into cylindrical pellets (⅛" by ⅛"). The pellets are dipped in $TiO_2$ sol (11% $TiO_2$, Nalco) to fill up the pores. The impregnated body is dried at 150° C. and then calcined at 500° C. for 1 hour. The dipping, drying and calcining are repeated 3 more times so that the final $TiO_2$ loading on the extruded body is about 20% by weight. It is believed this catalyst would be a good catalyst for $NO_x$ removal.

EXAMPLE 10

This example described the preparation of a catalyst powder for extrusion.

A titania catalyst powder suitable for extrusion was prepared as follows. 1690 g of titania powder was combined with 48 g of clay and the mixture dried at 200° C. A solution of 7.57 g of vanadium and 30.30 g of oxalic acid in 280 ml of water was prepared and combined with a solution pf 150.9 g of ammonium tungstate in 300 ml of water. The solution was then used to impregnate the mixture of titania and clay. The product was dried at 110° C., ground, and sieved to below 80 mesh.

EXAMPLE 11

This is a comparison example which describes the extrusion of bodies without the introduction of macroporosity.

A mixture of 100 g of the powder prepared in Example 10 was made with 2.5 g of Methocel 20-213 (Dow Chemical Co.) and 35 ml of water. The mixture was extruded to produce ⅛" diameter cylinders which were dried and calcined at 550° C. The resultant cylinders were analyzed by mercury intrusion porosimetry and found to contain only a small fraction of macroporosity (0.05 cc of pores with diameters greater than 600 Angstrom units/$cm^3$ of total volume).

EXAMPLE 12

This example describes the extrusion of bodies containing macropores.

A mixture of 100 g of the powder prepared in Example 10 was made with 15 g of Methocel 20-213 (Dow Chemical Co.) and 45 ml of water. The mixture was extruded to produce ⅛" diameter cylinders which were dried and calcined at 550° C. The resultant cylinders were analyzed by mercury intrusion porosimetry and found to contain a substantial fraction of macroporosity (0.17 cc of pores with diameters greater than 600 Angstrom units/$cm^3$ of total volume).

EXAMPLE 13

This example describes the extrusion of bodies containing macropores and which further contain silica.

A mixture of 100 g of the powder prepared in Example 10 was made with 20 g of Methocel 20-213 (Dow Chemical Co.), 11.1 g of silica (Syloid 63, Davison Chemical), and 35 ml of water. The mixture was extruded to produce ⅛" diameter cylinders which were dried and calcined at 550° C. The resultant cylinders were analyzed by mercury intrusion porosimetry and found to contain a substantial fraction of macroporosity (0.21 cc of pores with diameters greater than 600 Angstrom units/$cm^3$ of total volume).

EXAMPLE 14

This example measures the activity of the extrudates of Examples 11-13.

The activities of the extrudates described Examples 11, 12 and 13 were determined as follows. In a fixed bed reactor, about 0.3 $cm^3$ of extrudates were charged and the fixed bed reactor was heated in a sand bath to the temperatures set forth in Table 3 below. A gas containing 1275 ppm of NO, 1275 ppm on $NH_3$, and 4% $O_2$ in $N_2$ was passed through the catalyst bed at a rate of 200

1/hr and the amount of NO removed was measured. The rate of NO removal was calculated and the results are presented in Table 3.

TABLE 3

| | Rate of NO Removal by ⅛ inch extrudates | | | |
|---|---|---|---|---|
| | Porosity (a) | | $10^7$ mole NO removed/cm$^3$ — sec | |
| Example | Total | Macropores | 310° C. | 380° C. |
| 11 | 0.54 | 0.05 | 6.9 | 11.0 |
| 12 | 0.60 | 0.17 | 9.2 | 15.4 |
| 13 | 0.58 | 0.21 | 8.5 | 14.9 |

(a) Porosity is defined as cm$^3$ of pore volume/cm$^3$ of total volume. Total includes all pores and macropores are those pores with diameters greater than 600 Angstrom Units.

The data in Table 3 demonstrate the improved performance obtained by the introduction of macroporosity. The catalyst prepared in Example 12 differs from that in Example 11 only in the presence of the additional macroporosity and it is substantially more active than the catalyst of Example 11. The catalyst of Example 13 demonstrates that the presence of such macroporosity allows further addition to the catalyst by an inexpensive porous material such as silica while maintaining a high activity.

It is understood that the foregoing detailed description is given merely by way of illustration and that many variations may be made therein without departing from the spirit of this invention.

What is claimed is:

1. A process for the selective removal of nitrogen oxides from exhaust and waste gases, which comprises contacting the exhaust or waste gases with ammonia at a temperature of from about 150° C. to about 500° C. in the presence of a catalyst comprising:
   (a) a formed support of titania particles further containing porous inorganic oxide particles, said formed support having
      (i) a total porosity of up to 0.80 cc/cc which is made up of a micropore porosity (comprising pores having a pore diameter 600 Angstrom units of less) of 0.05 to 0.5 cc/cc and a macroporosity (comprising pores having a diameters greater than 600 Angstrom units) of 0.05 to 0.5 cc/cc, and
      (ii) said titania being substantially present in the anatase phase, and
   (b) a metal oxide catalytic component deposited on said support selected from the group consisting of $V_2O_5$, $MoO_3$, $WO_3$, $Fe_2O_3$, $CuSO_4$, $VOSO_4$, $SnO_2$, $Mn_2O_3$, $Mn_3O_4$, and mixtures thereof, said metal oxide being present in an amount from a catalytically effective amount to 25% by weight of the entire catalyst.

2. A process according to claim 1, wherein said porous inorganic oxide is selected from the group consisting of $SiO_2$, $Al_2O_3$, $ZrO_2$, $AlPO_4$, $Fe_2O_3$, $B_2O_3$ and mixtures thereof.

3. A process according to claim 1, wherein said catalyst further comprises barium sulfate in an amount of from 1–15% by weight of the formed support.

4. A process according to claim 3, wherein the porous inorganic oxide is silica gel or precipitated silica.

5. A process according to claim 1, wherein the catalyst is shaped as a monolith, extrudate, bead, or plate.

6. A process according to claim 1, wherein the catalyst comprises:
   (a) a formed porous supported of a mixture of titania and at least one other inorganic oxide, said formed support having
      (i) a total porosity of up to 0.80 cc/cc which is made up of a micropore porosity (comprising pores having a pore diameter 600 Angstrom units or less) of 0.05 to 0.5 cc/cc and a macroporosity (comprising pores having diameters greater than 600 Angstroms units) of 0.05 to 0.5 cc/cc,
      (ii) said titania being present in an amount of between about 5 to 80 wt% of the total support,
      (iii) said titania being substantially present in the anatase phase, and
   (b) a metal oxide catalytic component deposited on said support selected from the group consisting of $V_2O_5$, $MoO_3$, $WO_3$, $Fe_2O_3$, $CuSO_4$, $VOSO_4$, $SnO_2$, $Mn_2O_3$, $Mn_3O_4$, and mixtures thereof, said metal oxide being present in an amount from a catalytically effective amount to 25% by weight of the entire catalyst.

7. A process according to claim 6, wherein the total porosity is between 0.5 and 0.8 cc/cc and the surface area is less than 350 m$^2$/cc.

8. A process according to claim 6, wherein the formed body has a micropore size distribution (comprising pores having a pore diameter of 600 Angstrom units or less) having an average pore diameter of 50–150 Angstrom units and a macropore size distribution (comprising pores with a pore diameter between greater than 600 and 100,000 Angstrom units) having an average pore diameter between 1,000 and 20,000 Angstrom units.

9. A process according to claim 8, wherein the average micropore diameter is between 80 and 120 Angstrom units and wherein the average macropore diameter is between 5,000 and 15,000 Angstrom units.

10. A process according to claim 6, wherein said catalyst further comprises barium sulfate in an amount of from 1–15% by weight of the formed support.

11. A process according to claim 6, wherein said other inorganic oxide is selected from the group consisting of $SiO_2$, $Al_2O_3$, $ZrO_2$, $AlPO_4$, $Fe_2O_3$, $B_2O_3$, and mixtures thereof.

12. A process according to claim 11, wherein the porous inorganic oxide is silica gel or precipitated silica.

13. A process according to claim 8, wherein the catalyst is shaped as a monolith, extrudate, bead, or plate.

14. A process according to claim 1, wherein the titania is finely dispersed on the inorganic oxide particles.

* * * * *